(12) United States Patent
Tamura et al.

(10) Patent No.: US 11,941,439 B2
(45) Date of Patent: Mar. 26, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Ryota Tamura, Yokohama Kanagawa (JP); Mizuki Ono, Yokohama Kanagawa (JP); Masanori Furuta, Odawara Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 425 days.

(21) Appl. No.: 17/446,185

(22) Filed: Aug. 27, 2021

(65) Prior Publication Data

US 2022/0179688 A1 Jun. 9, 2022

(30) Foreign Application Priority Data

Dec. 9, 2020 (JP) ................................. 2020-204346

(51) Int. Cl.
  *G06F 9/48* (2006.01)
  *G06F 9/50* (2006.01)
  *G06N 3/04* (2023.01)

(52) U.S. Cl.
  CPC .......... *G06F 9/4881* (2013.01); *G06F 9/5038* (2013.01); *G06F 9/5088* (2013.01); *G06N 3/04* (2013.01)

(58) Field of Classification Search
  CPC ...... G06F 1/329; G06F 9/4806; G06F 9/4843; G06F 9/4881; G06F 9/4887
  See application file for complete search history.

(56) References Cited

U.S. PATENT DOCUMENTS 8,126,956 B2   2/2012   Bowers et al.
9,612,832 B2   4/2017   Shaw et al.
(Continued)

FOREIGN PATENT DOCUMENTS

JP    5592523 B2    9/2014
JP    2020 517006 A  6/2020

OTHER PUBLICATIONS

Zhuoran Zhao et al., "DeepThings: Distributed Adaptive Deep Learning Inference on Resource-Constrained IoT Edge Cluster," IEEE Transactions on Computer-Aided Design of Integrated Circuits and Systems, vol. 37, No. 11, 12 pages (Nov. 2018).

*Primary Examiner* — Andy Ho
(74) *Attorney, Agent, or Firm* — Finnegan, Henderson, Farabow, Garrett & Dunner, LLP

(57) ABSTRACT

According to an embodiment, an information processing device is configured to assign a first computing device one or more first tasks of processing respective one or more first partial data of a plurality of partial data included in an n-dimensional target data, n being an integer greater than or equal to 2, the target data being to be processed using a neural network, the one or more first partial data including first data and second data adjacent to the first data in a direction of m-dimension, m being an integer satisfying $1 \leq m \leq n$; and instruct the first computing device to execute a second task included in the one or more first tasks, according to an execution status of second partial data of the plurality of partial data included in the target data, the second partial data being executed by the second computing device.

13 Claims, 12 Drawing Sheets

(56) References Cited

U.S. PATENT DOCUMENTS

| | | | |
|---|---|---|---|
| 9,747,099 B2 | 8/2017 | Shaw et al. | |
| 10,387,298 B2 | 8/2019 | Baum et al. | |
| 10,824,422 B2 | 11/2020 | Bowers et al. | |
| 11,574,164 B2 * | 2/2023 | Dasgupta | G06N 3/084 |
| 2018/0285678 A1 | 10/2018 | Baum et al. | |
| 2018/0285718 A1 | 10/2018 | Baum et al. | |
| 2018/0285719 A1 | 10/2018 | Baum et al. | |
| 2018/0285725 A1 | 10/2018 | Baum et al. | |
| 2018/0285726 A1 | 10/2018 | Baum et al. | |
| 2018/0285727 A1 | 10/2018 | Baum et al. | |
| 2018/0285735 A1 | 10/2018 | Baum et al. | |
| 2018/0285736 A1 | 10/2018 | Baum et al. | |
| 2020/0082243 A1 * | 3/2020 | Jin | G06F 17/16 |
| 2023/0081715 A1 * | 3/2023 | Timofejevs | G06N 3/065 706/21 |

\* cited by examiner

FIG.8

| 1 | 9 |
|---|---|
| 13 | 5 |
| 2 | 10 |
| 14 | 6 |
| 3 | 11 |
| 15 | 7 |
| 4 | 12 |
| 16 | 8 |

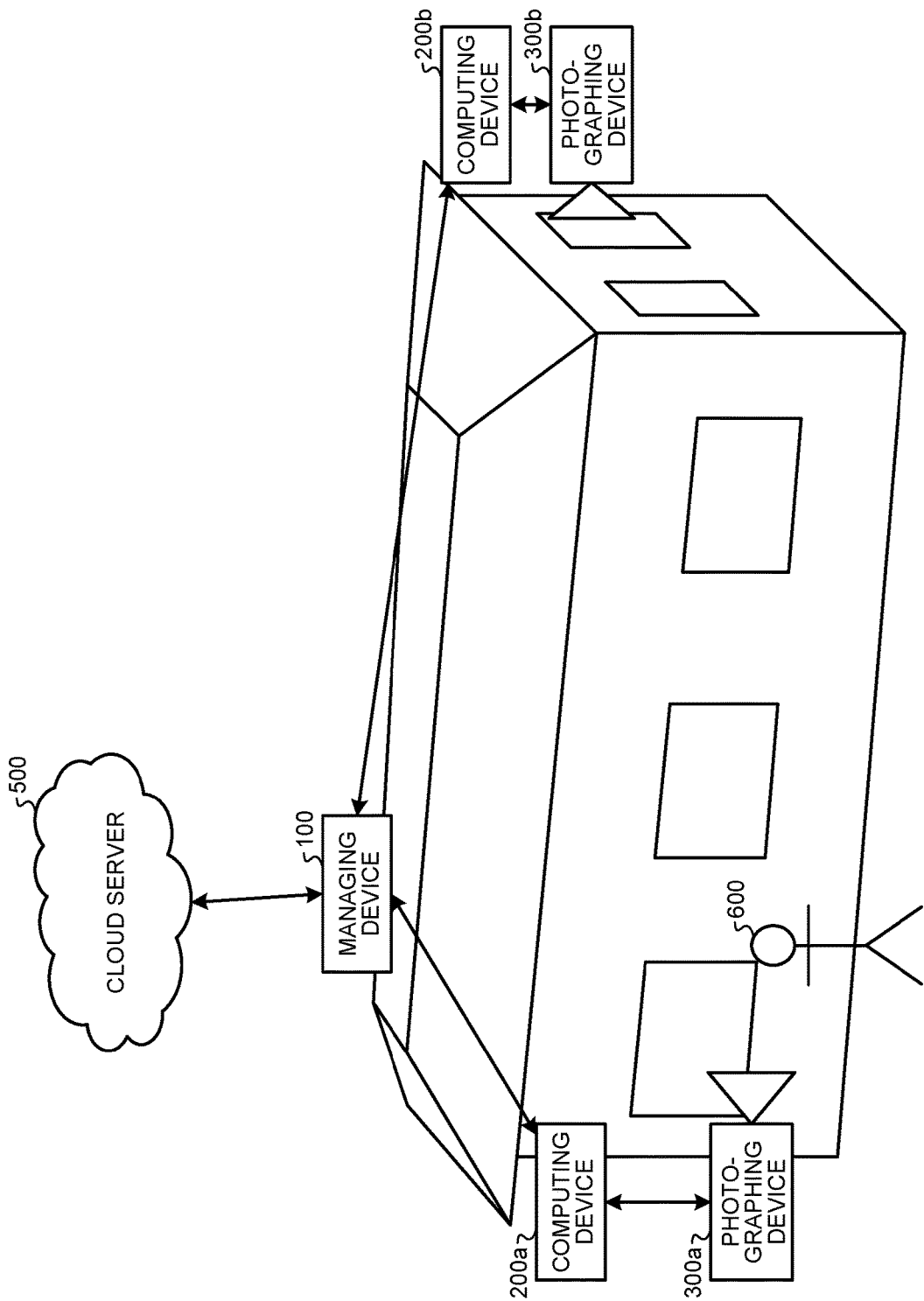

ND COMPUTER PROGRAM PRODUCT

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-204346, filed on Dec. 9, 2020; the entire contents of which are incorporated herein by reference.

FIELD

Embodiments described herein relate generally to an information processing device, an information processing method, and a computer program product.

BACKGROUND

A neural network processor system has been proposed that performs deep neural network (DNN) inference by connecting a plurality of DNN accelerators with an interface circuit.

Also, the following techniques have been proposed to partition and schedule a computational problem.

Technique that distributes tasks to computation units when dividing an N-body problem into subset problems Technique of fusing together a plurality of layers including convolution layers of a convolutional neural network (CNN), partitioning the fused layers into a plurality of fused tiles (FTs) in a row direction (height direction) and a column direction (width direction), and computing the individual tiles in parallel on a computer cluster (fused tile partitioning: FTP)

BRIEF DESCRIPTION OF THE DRAWINGS

FIG. 8 is a diagram of an example of partial data;
FIG. 9 is a diagram of an example of task scheduling;
FIG. 10 is a diagram of an example of task scheduling;
FIG. 15 is a diagram of an example in which an information processing system is implemented as a monitoring system.

DETAILED DESCRIPTION

Figure 1:
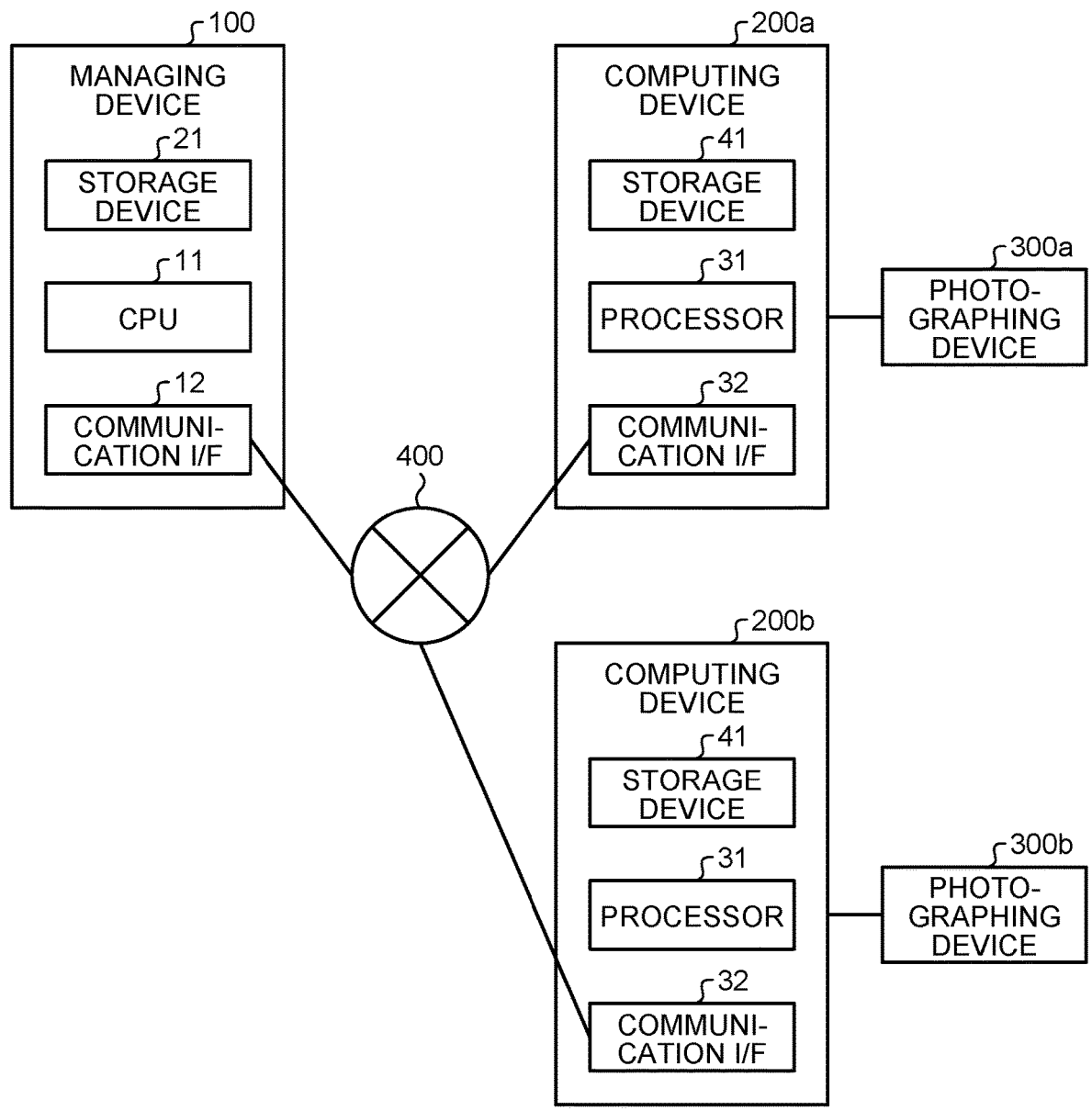
FIG. 1 is a block diagram of an information processing system according to an embodiment.

According to an embodiment, an information processing device is to be connected to a plurality of computing devices including a first computing device and a second computing device. The information processing device includes an assignment portion and an execution control portion. The assignment portion is configured to assign the first computing device one or more first tasks of processing respective one or more first partial data of a plurality of partial data included in an n-dimensional target data, n being an integer greater than or equal to 2, the target data being to be processed using a neural network, the one or more first partial data including first data and second data that is adjacent to the first data in a direction of m-dimension, m being an integer satisfying 1≤m≤n. The execution control portion is configured to instruct the first computing device to execute a second task included in the one or more first tasks, according to an execution status of second partial data of the plurality of partial data included in the target data, the second partial data being executed by the second computing device.

Referring to the attached drawings, a preferred embodiment of an information processing device according to the disclosure is now described in detail.

The following description mainly focuses on an example of a system in which a computation using a CNN is executed in a distributed manner by a plurality of computing devices. The applicable computation is not limited to a computation using a CNN, and may be a computation using a neural network other than that using a CNN. In the example described below, an image, as a processing target, photographed by a photographing device such as a camera is processed using a CNN. The data to be processed is not limited to an image and may be any data.

The information processing system according to an embodiment includes a managing device (an example of an information processing device) that manages the execution status of computation using a CNN, and a plurality of computing devices that perform distributed CNN computation. The managing device performs scheduling of the tasks of the CNN to be processed in a distributed manner such that some tasks that can share data or intermediate computation to be used are collectively assigned to each computing device, and that the managing device sends an instruction regarding a task to be actually executed among the assigned tasks. This shortens the execution time of tasks in each computing device.

Also, the managing device collectively sends the data (e.g., input/output feature maps and results of intermediate computations) required in the distributed processing of the CNN to the computing device that executes tasks. Furthermore, the managing device according to the embodiment collectively receives, from a computing device that has executed tasks, data required for other computing devices, for example. This reduces the number of times of communication for the data used for the computation.

FIG. 1 is a block diagram of an example of the configuration of the information processing system according to an embodiment. As illustrated in FIG. 1, the information processing system according to the embodiment includes a managing device 100, computing devices 200a and 200b, photographing devices 300a and 300b, and a network 400.

The photographing devices 300a and 300b are connected to the computing devices 200a and 200b, respectively. The photographing devices 300a and 300b photograph images and transmit the photographed images to the connected computing devices 200a and 200b.

In response to instructions from the managing device 100, the computing devices 200a and 200b execute distributed CNN computation. Since the computing devices 200a and 200b have the same configuration, they may be simply referred to as the computing devices 200 when it is not necessary to distinguish them. Similarly, since the photographing devices 300a and 300b have the same configuration, they may be simply referred to as the photographing devices 300 when it is not necessary to distinguish them.

FIG. 1 illustrates two computing devices 200 and two photographing devices 300, but the number of computing devices 200 and the number of photographing devices 300 may be three or more.

The network 400 connects the managing device 100 and the computing devices 200. The network 400 may be a network of any configuration, such as the Internet or a local area network (LAN). The network 400 may be any of a wireless network, a wired network, and a mixed wireless and wired network.

The managing device 100 is connected so as to be able to communicate with both of the computing devices 200 in the information processing system. It is not necessary for the computing devices 200 to communicate with each other without involving the managing device 100.

The managing device 100 includes a storage device 21, a central processing unit (CPU) 11, and a communication interface (I/F) 12 as the main hardware configuration.

The storage device 21 stores therein various types of information used in various processes performed by the managing device 100. For example, the storage device 21 stores therein a model structure including parameters (e.g., weight information) and connection relations of the layers of a CNN model.

The model structure also includes the information needed for the distributed execution of at least some layers. The information required for distributed execution includes the CNN layer types, the layer partitioning method, and the like. The layer types indicate the processes to be performed in the layers, such as rectified linear unit (ReLU) and convolution. The layer partitioning method includes the number of tasks into which the processing of layers is partitioned, and the overlapping state of computing between the partitioned tasks.

For example, in FTP, layers in which a plurality of layers are fused are partitioned into a plurality of FTs in a row direction and a column direction. Also, in FTP, an earlier layer may be partitioned into overlapping FTs for the processing in a later layer. As described above, the layer partitioning method may include information on the partition direction, the number of partitioned FTs, and the overlapping state of FTs (overlapping state of computation between tasks).

The partitioning method is not limited to the same method as FTP, and may be any method. For example, a method may be used that partitions a normal layer that is not layers in which a plurality of layers are fused, into a plurality of tiles in a direction of m-dimension (e.g., the row direction) and in a direction of a dimension different from the m-dimension (e.g., the column direction).

The CPU 11 is a processor capable of executing general operations including task scheduling. The communication I/F 12 communicates with other devices including the computing devices 200 via the network 400.

Each computing device 200 includes a storage device 41, a processor 31, and a communication I/F 32 as the main hardware configuration.

The storage device 41 stores therein various types of information used in various processes performed by the computing device 200. For example, the storage device 41 stores therein a partition model structure including parameters (e.g., weight information) of the layers to be processed by the computing device 200 in a distributed manner. Each computing device 200 is preset to perform distributed processing of some of the tasks of layers that are partitioned by the partitioning method described above. The partition model structure indicates the structure of a part of the model structure stored in the managing device 100 that corresponds to the tasks to be processed in a distributed manner by its own device.

The processor 31 may be a graphics processing unit (GPU), a field programmable gate array (FPGA), an application specific integrated circuit (ASIC), or the like that can execute processing of CNN models at high speed.

The communication I/F 12 communicates with other devices including the managing device 100 via the network 400.

The storage devices 21 and 41 may be any commonly used storage medium such as a flash memory, a memory card, a random-access memory (RAM), a hard disk drive (HDD), and an optical disc.

Figure 2:
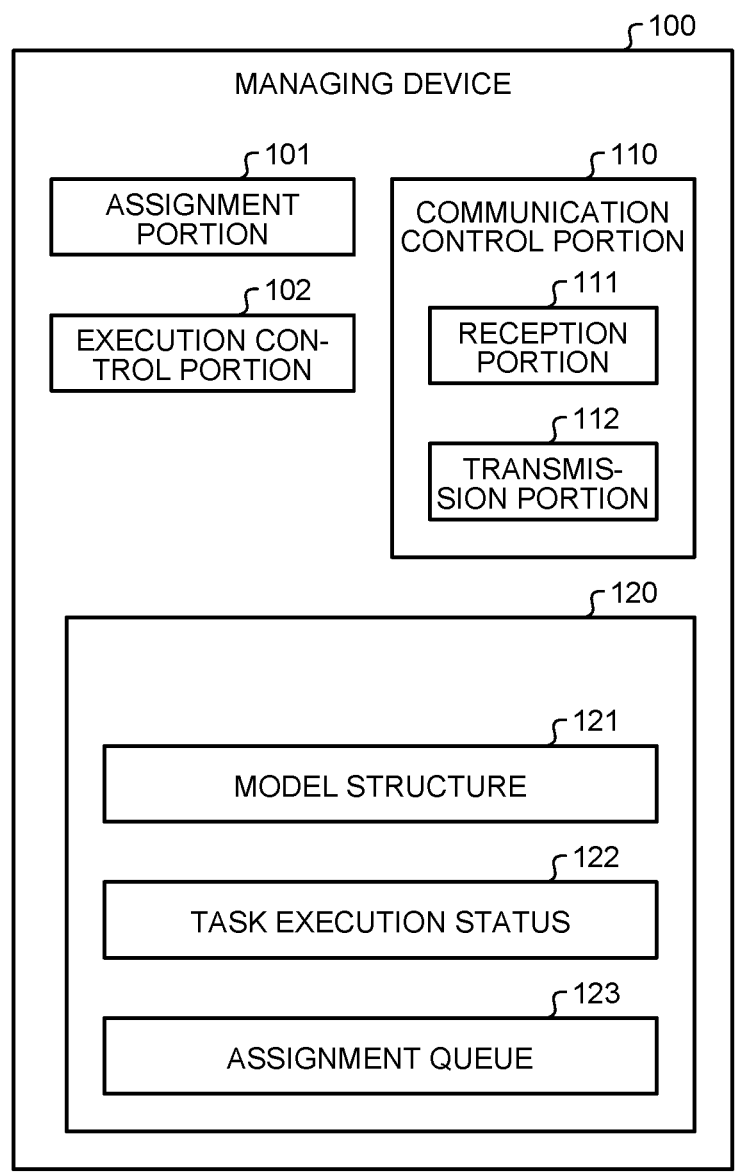
FIG. 2 is a block diagram of a managing device.

FIG. 2 is a block diagram of an example of the functional configuration of the managing device 100. As illustrated in FIG. 2, the managing device 100 includes a storage portion 120, an assignment portion 101, an execution control portion 102, and a communication control portion 110.

The storage portion 120 corresponds to the storage device 21 of FIG. 1, for example. The storage portion 120 stores therein a task execution status 122 in addition to a model structure 121 such as one described above, and also functions as an assignment queue 123.

The task execution status 122 includes execution statuses of different tasks. For example, the task execution status 122 is information that associates the information for identifying a task with an execution status. The execution status may indicate any of "unassigned", "assigned" (unexecuted), "being executed", or "executed", for example.

The assignment queue 123 stores therein the information on the tasks assigned to the computing devices 200. For example, an assignment queue 123 may be set for each computing device 200 and store therein the information on the tasks assigned to a corresponding one of the computing devices 200. Alternatively, a common assignment queue 123 may associate and store therein the identification information of the computing devices 200 and the information on the assigned tasks. The information on the task may be information that can identify the task, for example, which row and column the task exists in which layer of which CNN.

The assignment portion 101 assigns processing of the CNN to each computing device 200. For example, the assignment portion 101 refers to the model structure 121 (layer partitioning method) stored in the storage portion 120, and partitions the processing of the CNN into a plurality of tasks. Then, the assignment portion 101 assigns the partitioned tasks to each of the computing devices 200.

In the present embodiment, the assignment portion 101 assigns each computing device 200 one or more tasks TA (first tasks) of processing one or more pieces of partial data DA (first partial data) of a plurality of pieces of partial data included in n-dimensional target data (n is an integer greater than or equal to 2) that is processed using a CNN. The partial data DA includes data DAA (first data) and data DAB (second data), which are adjacent to each other. That is, the data DAB is adjacent to the data DAA in a direction of m-dimension (m is an integer satisfying $1 \le m \le n$).

The target data may be feature maps that are input or output of a CNN convolution layer. For example, feature maps may be two-dimensional image data (e.g., data including the pixel value of each RGB channel for each of the pixels in the row direction and the column direction) and data resulting from computing the two-dimensional image data in an earlier convolution layer. Here, the direction of m-dimension may be either the row direction or the column direction.

When there is a computing device 200 that has requested an execution of a task, that is, a computing device 200 that is available for tasks (e.g., the computing device 200b) but there are no unassigned tasks, the assignment portion 101 shifts some of the tasks assigned to another computing device 200 (e.g., the computing device 200a) to the computing device 200 that is available for tasks. For example, when the target data does not include data that is not assigned to a task, the assignment portion 101 assigns a part of the partial data that has been assigned to the other computing device 200 (e.g., computing device 200a) to the computing device 200 that has requested an execution of a task (e.g., computing device 200b). The details of the task assignment method by the assignment portion 101 will be described later.

The execution control portion 102 controls the execution of the assigned tasks. For example, the execution control portion 102 instructs one computing device 200 (e.g., computing device 200a) to execute a task TA' (second task) that is one of one or more tasks TA assigned to this computing device 200 (e.g., computing device 200a), according to the execution status of the partial data (second partial data) that is being executed by another computing device 200 (second computing device, e.g., the computing device 200b).

For example, the execution control portion 102 instructs the execution of the task TA' by sending an execution instruction from the communication control portion 110 (a transmission portion 112 described later). This execution instruction includes auxiliary data (first auxiliary data) indicating data to be used in the processing of the task TA' among the results of data processing performed by another computing device 200, and partial data to be processed with the task TA'. In this manner, in the present embodiment, data that is required in the distributed processing of the CNN (the partial data to be processed with the task TA' and processing results of the other computing device 200) are collectively sent as a request to the computing device 200 that executes the task.

The communication control portion 110 controls the communication with other devices such as the computing devices 200. The communication control portion 110 includes a reception portion 111 and the transmission portion 112.

The reception portion 111 receives information from other devices. For example, from a computing device 200 that an execution instruction such as the one described above has been sent, the reception portion 111 receives a response to the execution instruction. The response may include the processing result of the task TA' and auxiliary data (second auxiliary data) indicating data that is obtained during the execution of the task TA' (computation process) and is to be used for the processing by another computing device 200. As described above, in the present embodiment, as a response to one execution instruction, a response can be received that collectively includes data required for the subsequent processing.

Assuming that the task TA' is a task that processes FTs that are obtained by partitioning layers in which three layers of a layer LA, a layer LB, and a layer LC are fused, the output of the layer LC, for example, corresponds to the processing result of the task TA'. Also, of the output of at least one of the layer LA and the layer LB, the part to be used by another task (FT) that is adjacent to the task TA' (such as the output of an edge the FT) corresponds to the auxiliary data that is obtained in the computation process of the task TA' and is also used for processing by the other computing device 200.

The auxiliary data is not limited to the above, and may further include other information such as information indicating whether the surrounding tasks are unexecuted. The surrounding tasks are tasks that process adjacent partial data, for example.

The transmission portion 112 transmits information to other devices. For example, the transmission portion 112 transmits a task execution instruction to a computing device 200 in response to an instruction from the execution control portion 102.

Each of the portions described above (assignment portion 101, execution control portion 102, and communication control portion 110) may be implemented by one or more processors, for example. For example, each of the above portions may be implemented by causing a processor such as the CPU 11 to execute a computer program, that is, by software. Each of the above portions may be implemented by a processor such as a dedicated integrated circuit (IC), that is, by hardware. Each of the above portions may be implemented by using software and hardware in combination. When a plurality of processors are used, each processor may implement one of the portions, or may implement two or more of the portions.

Figure 3:
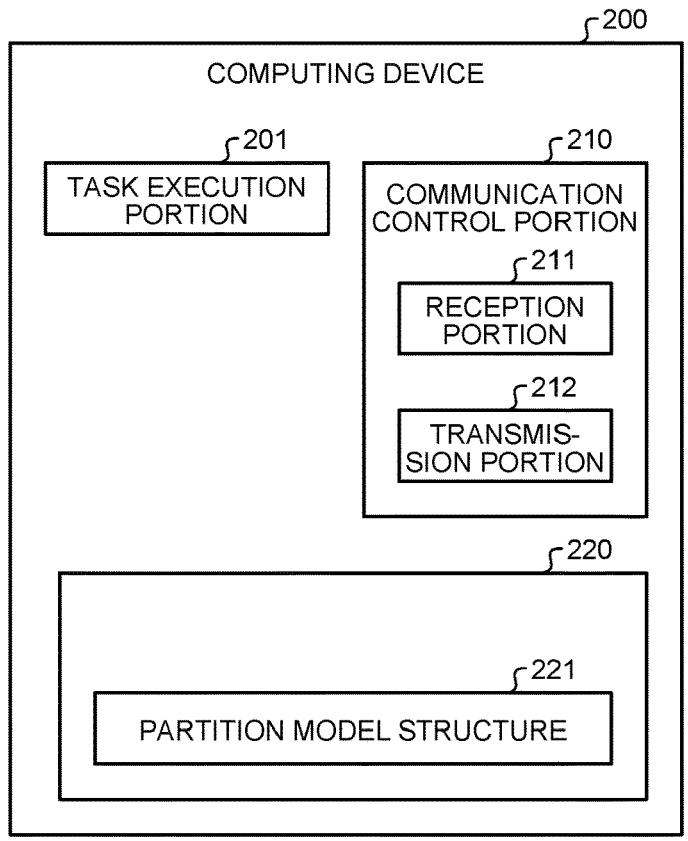
FIG. 3 is a block diagram of a computing device.

The functional configuration of the computing devices 200 is now described. FIG. 3 is a block diagram of an example of the functional configuration of the computing device 200. As illustrated in FIG. 3, the computing device 200 includes a storage portion 220, a task execution portion 201, and a communication control portion 210.

The storage portion 220 corresponds to the storage device 41 in FIG. 1, for example. The storage portion 220 stores therein a partition model structure 221 such as the one described above.

The task execution portion 201 executes a task according to an execution instruction from the managing device 100.

The communication control portion 210 controls communication with other devices such as the managing device 100. The communication control portion 210 includes a reception portion 211 and a transmission portion 212.

The reception portion 211 receives information from other devices. For example, the reception portion 211 receives an execution instruction from the managing device 100. The transmission portion 212 transmits information to other devices. For example, the transmission portion 212 transmits a response to the execution instruction to the managing device 100.

The portions described above (task execution portion 201 and communication control portion 210) may be implemented by one or more processors, for example. For example, each of the above portions may be implemented by causing a processor such as a CPU (e.g., the processor 31) to execute a computer program, that is, by software. Each of the above portions may be implemented by a processor such as a dedicated IC, that is, by hardware. Each of the above portions may be implemented by using software and hardware in combination. When a plurality of processors are used, each processor may implement one of the portions, or may implement two or more portions.

Figure 4:
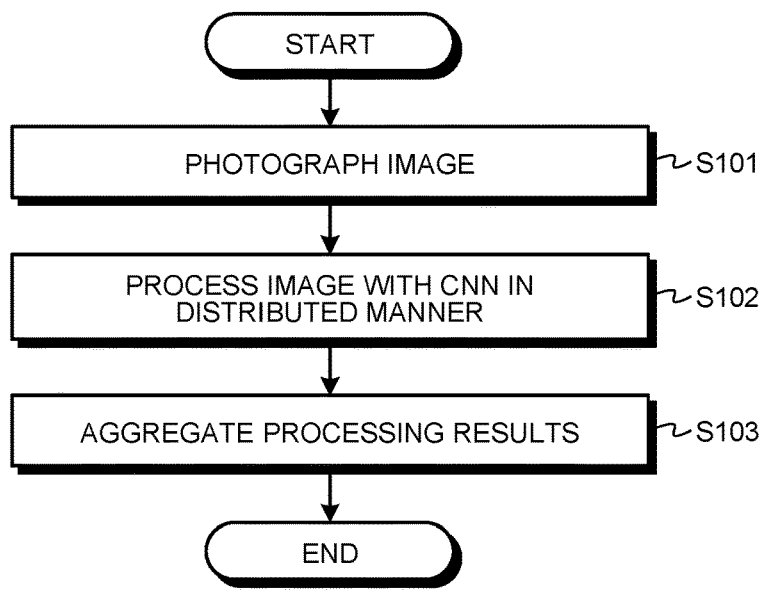
FIG. 4 is a flowchart of an outline of an operation of the information processing system according to the embodiment.

Referring to FIG. 4, the operation of the information processing system according to the present embodiment is now described. FIG. 4 is a flowchart of an outline of the operation of the information processing system according to the present embodiment.

First, the photographing device 300a photographs an image and transmits the photographed image to the connected computing device 200 (step S101).

The computing device 200 then notifies the managing device 100 of a start of execution of a CNN, and performs the distributed processing of the CNN in cooperation with the other computing device 200 (step S102).

Lastly, the managing device 100 receives the processing results (e.g., output feature maps) from the computing devices 200 that have performed the distributed processing, and aggregates (integrates) the received processing results (step S103). The processing result of the entire CNN is thus obtained.

Figure 5:
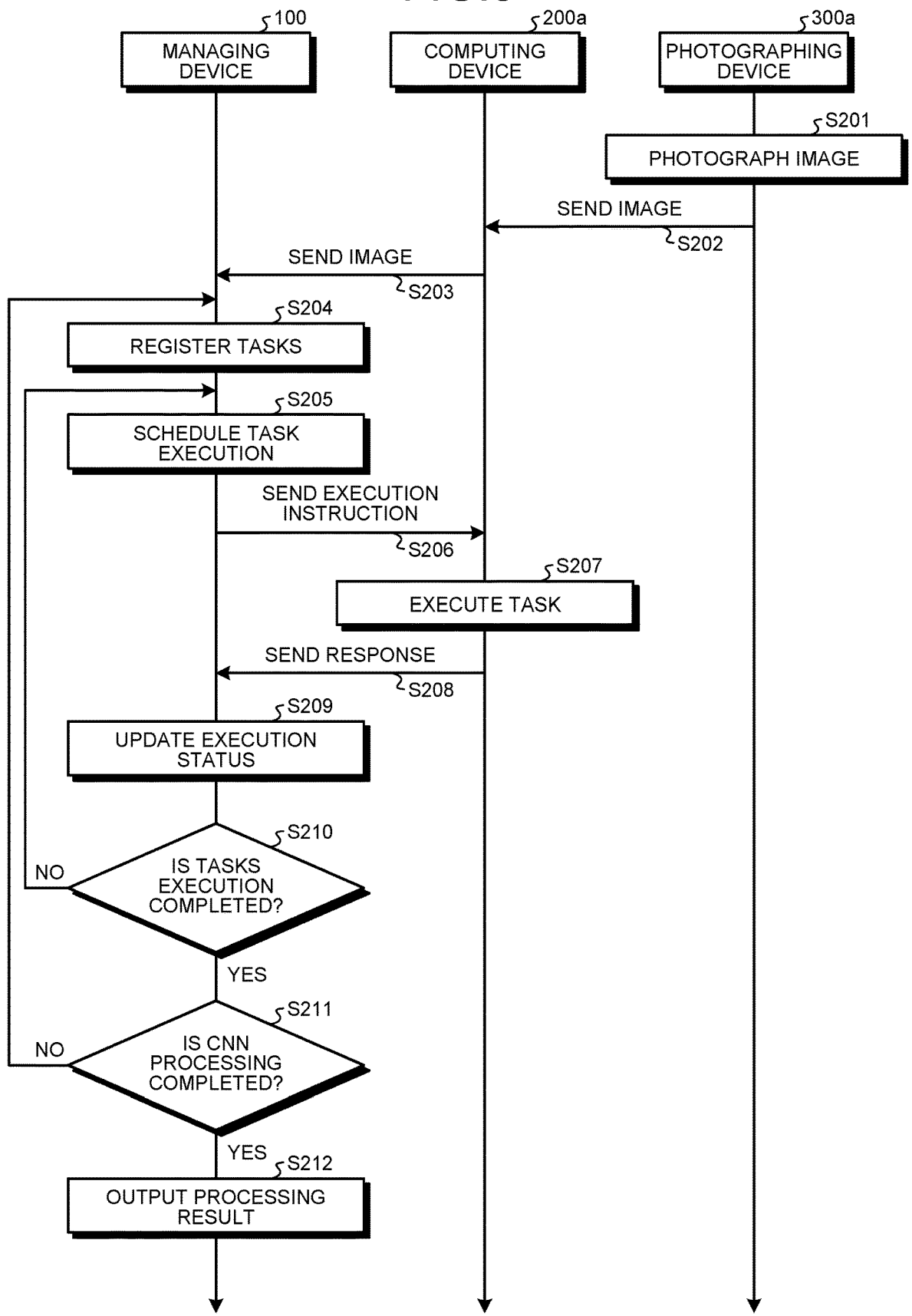
FIG. 5 is a sequence diagram of a distributed execution operation of a CNN.

The distributed execution operation of a CNN by the information processing system according to the present embodiment is now described. FIG. 5 is a sequence diagram of an example of distributed execution operation of a CNN of the information processing system according to the present embodiment. FIG. 5 illustrates an example in which a CNN process is executed for an image photographed by the photographing device 300a connected to the computing device 200a.

The photographing device 300a photographs an image (step S201). The photographing device 300a transmits the photographed image to the computing device 200a (step S202). The computing device 200a notifies the managing device 100 that an image to be processed using a CNN has been obtained, and transmits the received image to the managing device 100 (step S203).

The managing device 100 registers tasks for the image received from the computing device 200a (step S204). For example, the assignment portion 101 of the managing device 100 reads out the model structure 121 from the storage portion 120. The assignment portion 101 refers to the model structure 121 and determines one or more layers that can be processed (in the case of FTP or the like, layers in which a plurality of layers are fused together) according to the processing order of the layers constituting the CNN.

For example, under the following conditions, a plurality of layers can be processed in parallel, and the assignment portion 101 can determine a plurality of layers as layers that can be processed.

Images from a plurality of computing devices 200 are being processed simultaneously.
  The CNN has a structure that branches.

The assignment portion 101 refers to the read information (information required for distributed execution of layers) and partitions the processing of the determined layers into a plurality of tasks. The CNN may include layers to which distributed processing is not applied (e.g., fully connected layers). In this case, the assignment portion 101 does not partition the processing for these layers into a plurality of tasks. The assignment portion 101 registers the processing of the determined layers with the storage portion 120 (task execution status 122) as tasks that need to be executed (execution status=unassigned).

The following process from steps S205 to S210 is repeated until the execution of the registered tasks is completed.

First, the assignment portion 101 reads the task execution status 122 from the storage portion 120, refers to the read task execution status 122, and performs scheduling of the task execution order (step S205). For example, the scheduling determines which of the computing devices 200 is assigned a task having the execution status of "unassigned", and the execution order of the tasks. The details of scheduling are described below.

Then, the execution control portion 102 instructs the computing device 200a to execute an assigned task (step S206). In some cases, tasks are assigned to the computing device 200b, and the computing device 200b is instructed to execute the task. These cases will be described later.

The tasks assigned to the computing device 200a are referred to as tasks TA. Of the tasks TA, the task for which an execution instruction is sent is referred to as a task TA'. For example, the execution instruction includes the following information.

Computation type of the task TA'
  Partial data to be processed with the task TA' (e.g., the data required for the task TA' in the input feature maps)
  Auxiliary data (e.g., part of the intermediate computation performed with a task other than the task TA' that is necessary for the processing of the task TA', and information indicating whether the surrounding tasks are unexecuted)

The execution control portion 102 may be configured so as not to redundantly transmit data that is already present in the computing device 200a. The presence or absence of data can be determined, for example, based on whether the computing device 200 that has executed the task of computing at least one of the partial data to be processed with the task TA' and the auxiliary data is the computing device 200a to which an execution instruction of the task TA' is to be transmitted.

The computing device 200a that has received the execution instruction reads the layer parameters (e.g., weight information) from the partition model structure 221 as needed, and executes the instructed task TA' (step S207).

After executing the task TA', the computing device 200a transmits a response to the execution instruction to the managing device 100 (step S208). The response includes the following information, for example.

Information indicating that the execution of the task TA' is completed
  Processing result of the task TA' (e.g., output feature map)
  Auxiliary data (e.g., the result of intermediate computation that may be reused by another computing device 200, which may be determined based on the execution status of surrounding tasks that are the auxiliary data included in the execution instruction)

Upon receiving the response, the managing device 100 updates the task execution status 122 stored in the storage portion 120 (step S209). For example, the managing device 100 registers that the execution of the task TA' is completed.

The managing device 100 determines whether the tasks for the layers are completed (step S210). For example, when the layer processing is partitioned into a plurality of tasks, the assignment portion 101 determines whether all the tasks are completed.

If the tasks are not completed (No at step S210), the process returns to task scheduling (step S205), and the process is repeated. If the tasks are completed (Yes at step S210), the managing device 100 determines whether the processing of all the layers of the CNN is completed (step S211).

If the processing is not completed (No at step S211), the process returns to step S204, and the process is repeated from the registration of tasks for the next layer. If the processing is completed (Yes at step S211), the managing device 100 outputs the processing result of the CNN (step S212), and ends the distributed execution operation.

As described above, steps S206 to S208 can be achieved with a total of two times of communications: one communication from the managing device 100 to the computing device 200a (transmission of an execution instruction); and one communication from the computing device 200a to the managing device 100 (transmission of a response). This reduces the number of times of communications as compared to a configuration (hereinafter referred to as a comparison example) in which an execution instruction and a response regarding a task are sent and received separately from sending and receiving of the data required to perform the task.

For example, the comparison example may have the following configuration.

- The data used for computation (e.g., feature maps) is distributed and stored in each computing device.
- The execution instruction of a task and a notification of the completion of the task (response) are transmitted and received between the computing device and the managing device (number of times of communications=2 times).
- The data required for the task for which an execution is instructed is transmitted and received between computing devices (number of times of communications=2 times).

Communications between devices may involve delay time caused by factors such as the cost of communication initialization, in addition to the transfer time of the data itself. Since the delay time occurs for each communication, a reduced number of times of communications results in a shorter delay time.

Figure 6:
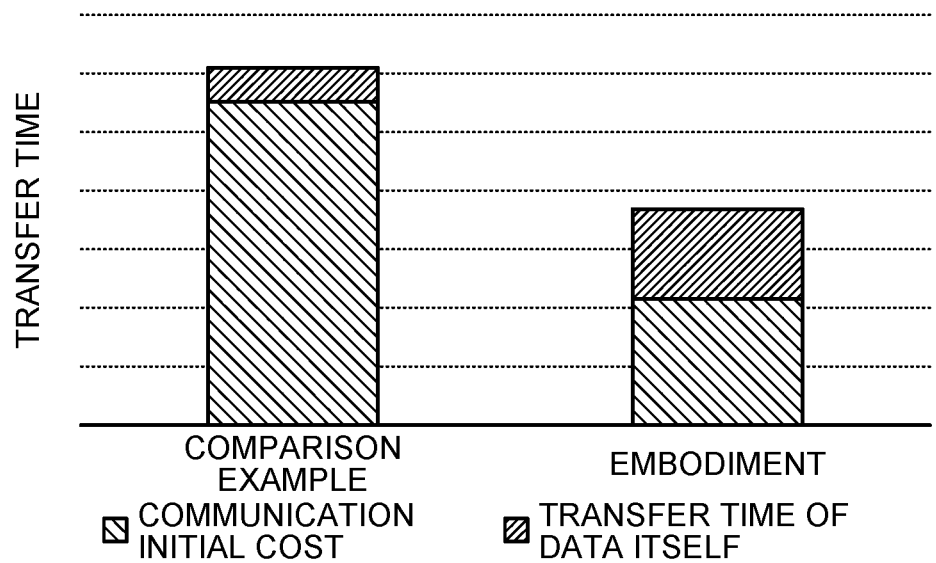
FIG. 6 is a diagram of an example of the breakdowns of transfer times of a comparison example and the present embodiment.

In this embodiment, the data used for the computation is transmitted and received between the computing devices via the managing device. This may increase the transfer time of the data itself as compared to the comparison example. On the other hand, since the number of times of communications can be reduced as described above, the delay time can be reduced. FIG. 6 illustrates an example of the breakdowns of the transfer times of the comparison example and the present embodiment. For example, in a situation in which the decrease in the delay time has a larger influence than the increase in the transfer time of the data itself does, the present embodiment can improve the communication efficiency as illustrated in FIG. 6. This increases the efficiency of the execution of the partitioned computation.

Figure 7:
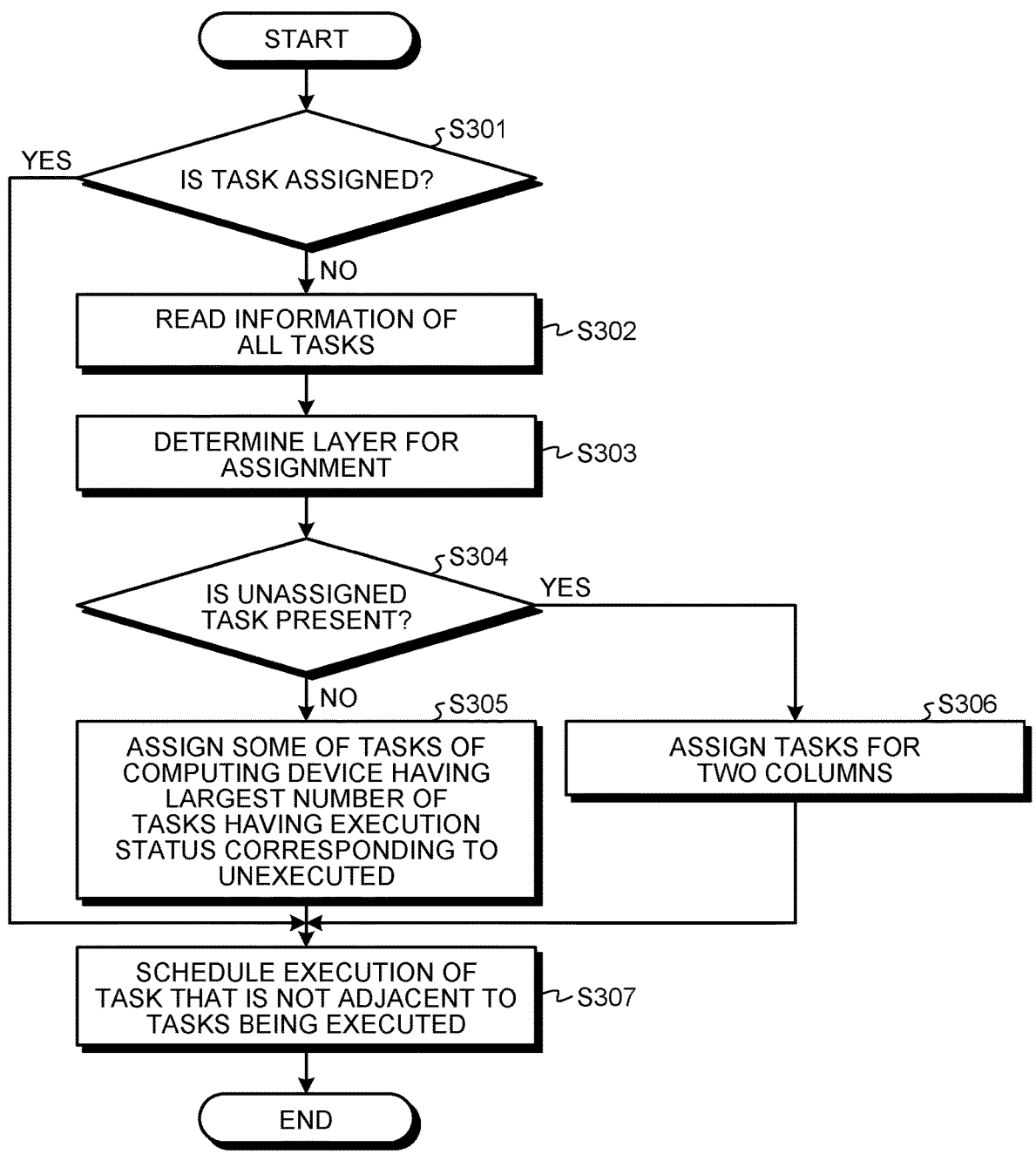
FIG. 7 is a flowchart of task scheduling.

The details of the scheduling at step S205 of FIG. 5 are now described. FIG. 7 is a flowchart of an example of task scheduling.

The assignment portion 101 determines whether a task has already been assigned to the computing device 200 that is the target of task assignment (step S301). For example, the assignment portion 101 determines whether the information of an assigned task is stored in the assignment queue 123 corresponding to the target computing device 200.

When an assigned task is not present (No at step S301), the assignment portion 101 reads out the execution statuses of all the tasks from the task execution status 122 of the storage portion 120 (step S302).

When a plurality of layers are simultaneously registered, the assignment portion 101 determines tasks of which layer are to be executed (step S303).

The assignment portion 101 then determines whether tasks having the execution status of "unassigned" are present in the assignment target layer (step S304). If unassigned tasks are present (Yes at step S304), the assignment portion 101 assigns, out of the unassigned tasks, tasks for two columns to the computing device 200 (step S306). That is, the assignment portion 101 registers the tasks for two columns with the assignment queue 123 corresponding to the assignment target computing device 200. The tasks for two columns correspond to tasks TA of processing the partial data DA including the data DAA and the data DAB that are adjacent to each other, which are described above. If there are no unassigned tasks left for two columns, the assignment portion 101 registers tasks for one column with the assignment queue 123.

Figure 8:
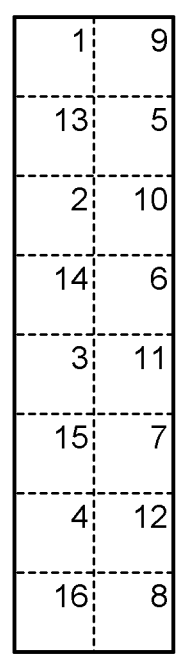

FIG. 8 is a diagram illustrating an example of the partial data DA. As illustrated in FIG. 8, the partial data DA includes 16 subregions (2 columns×8 rows). One subregion is processed with one task. In the example of FIG. 8, the direction of the columns corresponds to the direction of m-dimension, and the direction of the rows corresponds to the direction of a dimension orthogonal to the m-dimension.

When the partial data DA is divided into blocks each including four subregions of 2×2, the assignment portion 101 determines the execution order of tasks so that the tasks corresponding to the four subregions included in each block are executed in a predetermined order. The predetermined order may be, for example, the order of the upper left subregion, the lower right subregion, the upper right subregion, and the lower right subregion. Additionally, as illustrated in FIG. 8, among the blocks, the execution order of the subregions at the corresponding positions is determined in the order from an upper block to a lower block in the row direction. As a result, the execution order of the tasks for processing the subregions included in the partial data DA is determined as indicated by the numbers illustrated in FIG. 8.

Returning to FIG. 7, when unassigned tasks are not present at step S304 (No at step S304), the assignment portion 101 assigns some of the tasks of the computing device 200 having the largest number of tasks having the execution status of "unexecuted", to another computing device 200 that is the target of assignment (step S305).

For example, the assignment portion 101 searches for the computing device 200 that has the largest number of tasks having the execution status of "unexecuted" among the computing devices 200 that are executing tasks of the assignment target layer. Then, the assignment portion 101 assigns the tasks corresponding to the half of the tasks that have been assigned to the searched computing device 200 and have the execution status of "unexecuted", to another computing device 200 that is the new task assignment target. At this time, the assignment portion 101 selects, alternately from the top of the execution order, the tasks with their assignment destinations to be shifted. The tasks corresponding to the half may be C/2 tasks when the number of unexecuted tasks C is even, and may be (C+1)/2 or (C−1)/2 when the number C is odd, for example.

When it is determined, at step S301, that assigned tasks are present (Yes at step S301), after completing step S305, or after completing step S306, the assignment portion 101 performs scheduling of task execution so as to execute, of the tasks registered with the assignment queue 123, the task that is the highest in the execution order and that is not adjacent to tasks being executed by another computing device 200 (step S307).

When all the tasks registered with the assignment queue 123 are adjacent to tasks that are being executed by the other computing device 200, the assignment portion 101 performs scheduling so as to execute the task that is the highest in the execution order and that has the least number of adjacent tasks that are being executed.

Referring to FIGS. 9 to 12, examples of the task scheduling are now described. Each figure illustrates a result of scheduling performed on a total of 64 FTs (8×8 FTs) obtained by partitioning layers (layers obtained by fusing three 3×3-size convolution layers through FTP) into eight in the row direction and eight in the column direction. Each value indicates a value that identifies the computing device to which the task of processing the FT is assigned.

Figures 9, 10:
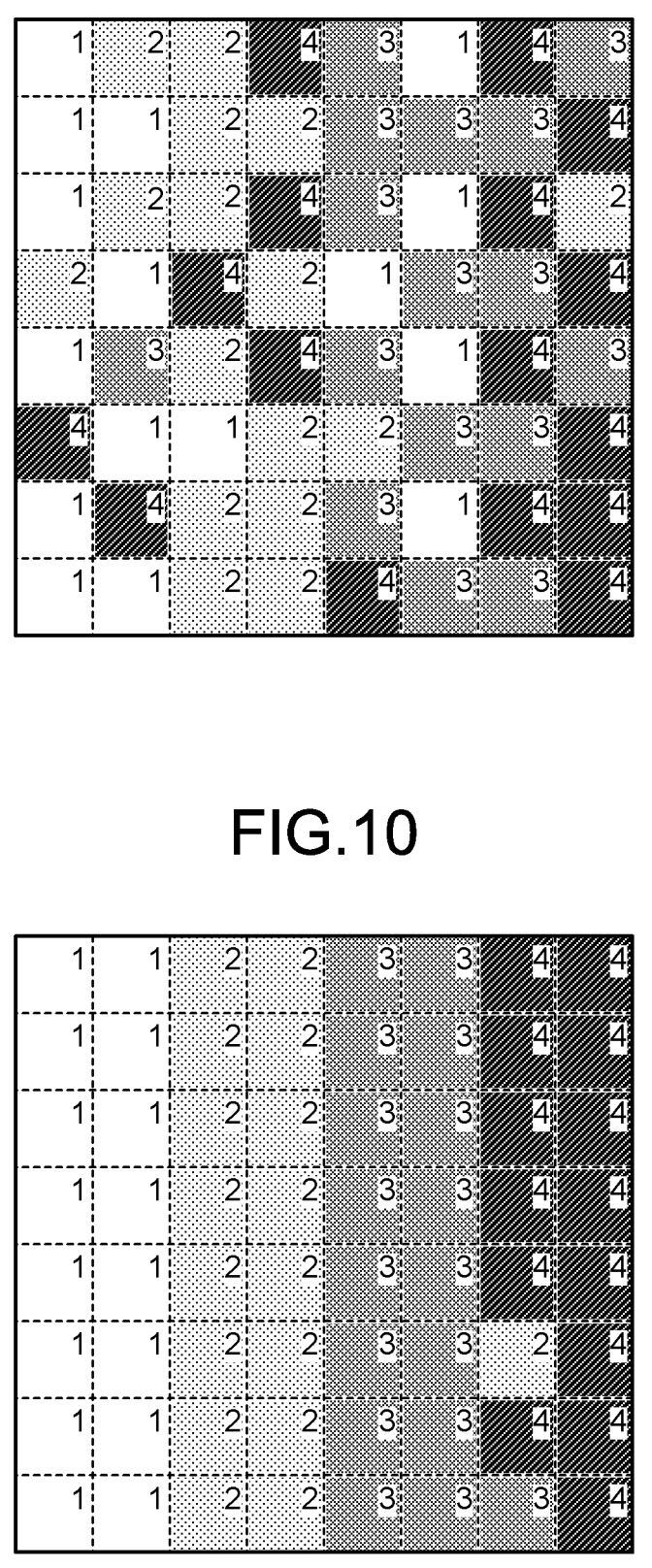
Figure 11:
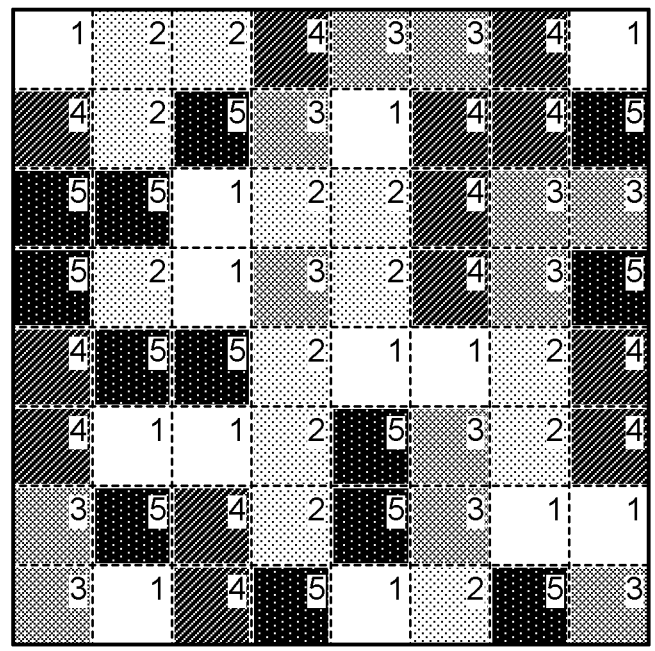
FIG. 11 is a diagram of an example of task scheduling.

FIGS. 9 and 11 are examples of the results of scheduling performed according to the method disclosed in Zhuoran Zhao, Kamyar Mirzazad Barijough, and Andreas Gerstlauer, "DeepThings: Distributed Adaptive Deep Learning Inference on Resource-Constrained IoT Edge Clusters", IEEE Transactions on Computer-Aided Design of Integrated Circuits and Systems (Volume: 37, Issue: 11, Nov. 2018) (hereinafter referred to as Zhao). FIG. 9 is the result of scheduling for four computing devices, while FIG. 11 is the result of scheduling for five computing devices.

Figure 12:
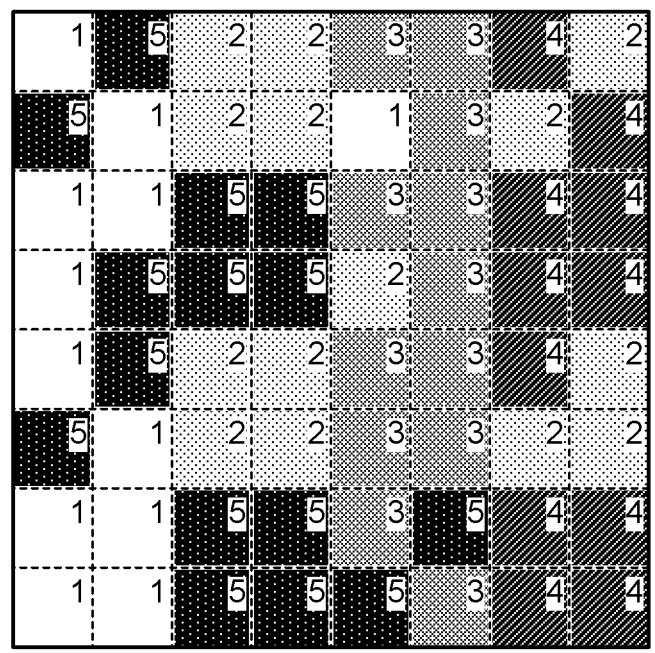
FIG. 12 is a diagram of an example of task scheduling.

FIGS. 10 and 12 are examples of the results of scheduling performed according to the method of the present embodiment. FIG. 10 is the result of scheduling for four computing devices, while FIG. 12 is the result of scheduling for five computing devices.

As illustrated in FIGS. 9 and 11, with Zhao's method, there are many parts where adjacent FTs are scheduled to be executed by different computing devices. In contrast, the method of the present embodiment reduces such parts since tasks of processing partial data including data that are adjacent to one another (FTs) are assigned to each corresponding computing device. Executing adjacent FTs in one computing device eliminates the need for communicating the intermediate computation between computing devices. This allows the partitioned tasks to be executed efficiently.

Figure 13:
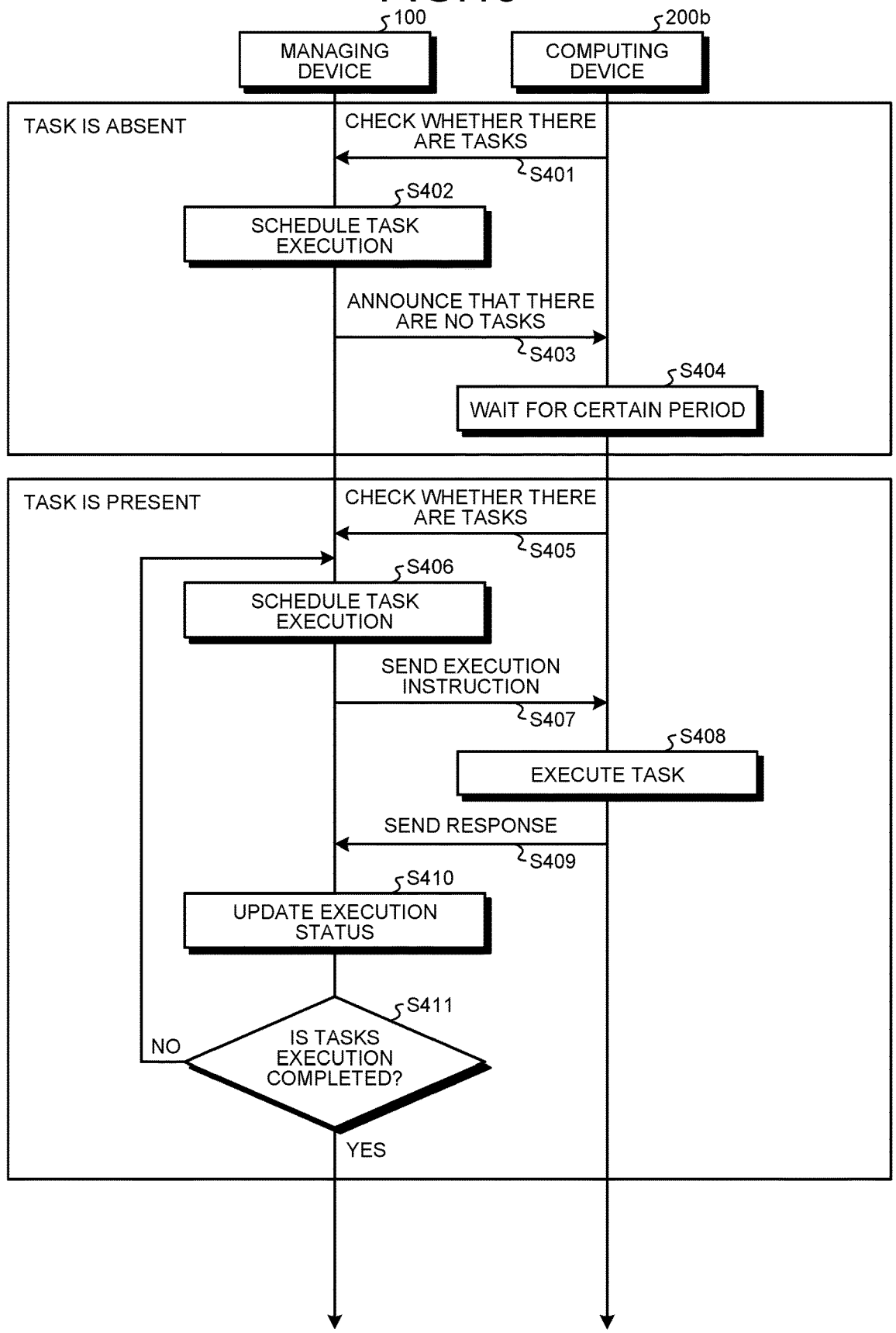
FIG. 13 is a sequence diagram of a distributed execution operation of tasks.

Referring to FIG. 13, the operation of distributed execution of tasks performed by a computing device that is different from the computing device that has instructed processing using a CNN is now described. FIG. 13 includes an example of the operation of distributed execution of tasks performed by the computing device 200b when the computing device 200a instructs CNN processing as shown in FIG. 5.

Steps S401 to S404 are examples of an operation performed when there are no unexecuted tasks. Step S405 and the subsequent steps are examples of an operation performed when there are unexecuted tasks.

When the computing device 200b becomes available for a new task upon completing the tasks that have been assigned for execution, for example, the computing device 200b checks with the managing device 100 whether there are unexecuted tasks (step S401). The assignment portion 101 of the managing device 100 performs the scheduling of task execution order in the same manner as at step S205 (FIG. 7) (step S402) If tasks to be assigned are absent as a result of the scheduling, the managing device 100 (transmission portion 112) notifies the computing device 200b that there are no tasks (step S403). Upon receiving this notification, the computing device 200b waits for a certain period of time (step S404).

After waiting for a certain period of time, the computing device 200b again checks with the managing device 100 whether there are unexecuted tasks (step S405). The assignment portion 101 of the managing device 100 performs the scheduling of task execution order in the same manner as at step S205 (FIG. 7) (step S406). When unexecuted tasks are assigned to the computing device 200b as a result of the scheduling, an execution instruction for one of the assigned tasks is sent to the computing device 200b according to the execution order (step S407).

Steps S408 to S411 are the same as steps S207 to S210 of FIG. 5. Although some steps including steps S211 and S212 in FIG. 5 are omitted in FIG. 13, the same process as in FIG. 5 is performed until the operation of CNN ends.

The present embodiment may be implemented by replacing some of the operations with any one or more of the following modifications.

First Modification

The tasks of the layers for distributed processing of a neural network may be tasks that process FTs obtained by the technique of FTP, that is, a plurality of tasks each processing a corresponding one of the FTs obtained by partitioning layers in which a plurality of layers including at least a convolution layer are fused, in the row direction and the column direction.

Second Modification

The execution control portion 102 may send an execution instruction so as to execute, instead of one assigned task, a plurality of assigned tasks in succession. For example, the execution control portion 102 transmits an execution instruction including partial data (input feature map) and auxiliary data to be used in a plurality of tasks to the computing device 200 to which the tasks are assigned. The managing device 100 (reception portion 111) receives, from the computing device 200, a response including one processing result (output feature map) and auxiliary data of the tasks. The tasks may be a plurality of tasks adjacent to each other. In this case, it is not necessary to transmit auxiliary data indicating the data used in adjacent tasks, so that the communication volume can be reduced.

Third Modification

Each computing device 200 may receive an execution instruction for a new task while executing another task, instead of receiving the new task after sending a response to the managing device 100 upon completing a task, as at step S208. This allows parts of processes relating to a plurality of tasks to be executed in parallel, further improving the efficiency of the CNN computation. Examples of processes that can be executed in parallel are as follows.

Figure 14:
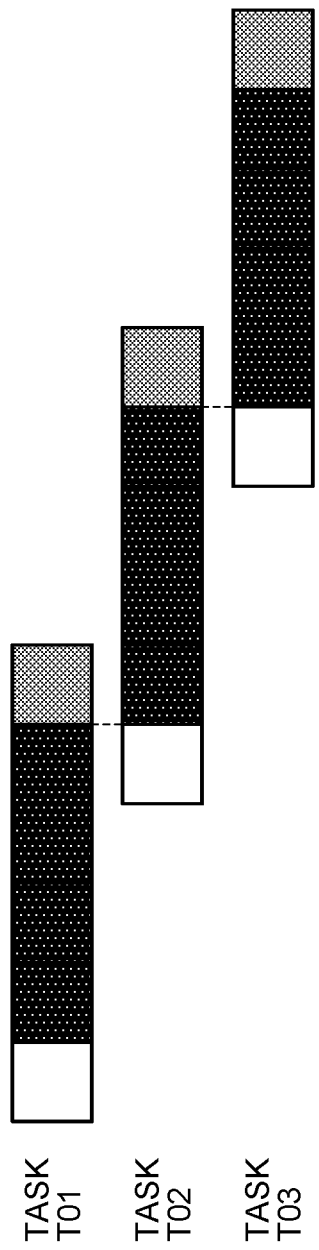
FIG. 14 is a diagram of an operation example in which processes relating to three tasks are parallelized.

Computation of one task and reception of an execution instruction for the next task Transmission of a response including the processing result of one task and computation of the next task FIG. 14 is a diagram of an operation example where the processes relating to three tasks T01, T02, and T03 are parallelized. The white square represents the reception of an execution instruction. The black rectangle represents the task computation. The gray square represents the transmission of a response including the processing result of the task.

Fourth Modification

The method of inputting an image to be processed with a CNN is not limited to the method of transmitting an image photographed by the photographing device 300 to the managing device 100 via the computing device 200. An image may be input to the managing device 100 by any method. For example, a method in which the managing device 100 reads out and inputs an image stored in a storage medium, and a method in which an image is received and input from a device connected to the network 400 may be used.

Example of Applicable System

The information processing system of the present embodiment is applicable to a building monitoring system, for example. FIG. 15 is a diagram of an example of implementing the information processing system of the present embodiment as a monitoring system. In the monitoring system, when an image of a person 600 is photographed by the photographing device 300a such as a surveillance camera, image recognition processing with a CNN for the photographed image is executed efficiently in a distributed manner by the computing devices 200a and 200b. Upon completing the computation, the managing device 100 cooperates with a cloud server 500 to perform operations such as contacting the security center and managing the attendance of workers.

As described above, according to the present embodiment, the communication in distributed execution of neural network processing can be optimized and partitioned computation can be efficiently executed.

A computer program to be executed by the information processing device according to the embodiment may be incorporated in advance in a ROM or the like and provided.

The computer program to be executed by the information processing device according to the embodiment may be recorded in a computer-readable recording medium, such as compact disc read only memory (CD-ROM), flexible disk (FD), compact disc recordable (CD-R), or digital versatile disc (DVD), in a file of an installable format or an executable format, and provided as a computer program product.

Also, the computer program to be executed by the information processing device according to the embodiment may be configured to be stored in a computer connected to a network such as the Internet and provided through downloading via the network. Furthermore, the computer program to be executed by the information processing device according to the embodiment may be configured to be provided or distributed via a network such as the Internet.

The computer program to be executed by the information processing device according to the embodiment can cause a computer to function as the portions of the information processing device described above. The computer can read the computer program from a computer-readable storage medium onto the main storage device and execute the computer program with the CPU.

While certain embodiments have been described, these embodiments have been presented by way of example only, and are not intended to limit the scope of the inventions. Indeed, the novel devices, methods, and computer programs described herein may be embodied in a variety of other forms; furthermore, various omissions, substitutions and changes in the form of the devices, methods, and computer programs described herein may be made without departing from the spirit of the inventions. The accompanying claims and their equivalents are intended to cover such forms or modifications as would fall within the scope and spirits of the inventions.

What is claimed is:

1. An information processing device to be connected to a plurality of computing devices including a first computing device and a second computing device, the information processing device comprising:
   one or more processors configured to:
      assign the first computing device one or more first tasks of processing respective one or more first partial data of a plurality of partial data included in an n-dimensional target data, n being an integer greater than or equal to 2, the target data being to be processed using a neural network, the one or more first partial data including first data and second data that is adjacent to the first data in a direction of m-dimension, m being an integer satisfying 1≤m≤n; and
      instruct the first computing device to execute a second task included in the one or more first tasks, according to an execution status of second partial data of the plurality of partial data included in the target data, the second partial data being executed by the second computing device.

2. The information processing device according to claim 1, wherein the one or more processors are configured to instruct execution of the second task by sending the first computing device an execution instruction including first auxiliary data and the first partial data to be processed with the second task, the first auxiliary data indicating data to be used in processing of the second task among a processing result of the second partial data.

3. The information processing device according to claim 2, wherein the one or more processors are configured to receive a response to the execution instruction from the first computing device, the response including a processing result of the second task and second auxiliary data indicating data that is obtained during execution of the second task and is to be used in processing by the second computing device.

4. The information processing device according to claim 1, wherein the one or more processors are configured to instruct execution of a plurality of second tasks included in the one or more first tasks.

5. The information processing device according to claim 1, wherein the target data comprises tiles obtained by partitioning n-dimensional data in the direction of the m-dimension and in a direction of a dimension different from the m-dimension.

6. The information processing device according to claim 5, wherein
   the neural network comprises a convolutional neural network, and
   the tiles comprise fused tiles obtained by partitioning data in which a plurality of layers including at least a convolution layer included in the convolutional neural network are fused.

7. The information processing device according to claim 1, wherein the one or more processors are configured to, when the target data does not include partial data that is unassigned to a task, assign the first computing device a third task of processing a part of third partial data to be processed with a task that is assigned to the second computing device.

8. The information processing device according to claim 7, wherein
   the third partial data includes a plurality of subregions, and
   the one or more processors are configured to:
      assign execution orders to the plurality of subregions; and
      when the target data does not include partial data that is unassigned to a task, assign the first computing device the third task of processing subregions that are selected alternately in the execution order from the subregions.

9. The information processing device according to claim 8, wherein the third partial data includes one or more blocks each including an upper left subregion, an upper right subregion that is adjacent to the upper left subregion in the direction of the m-dimension, a lower left subregion that is adjacent to the upper left subregion in a direction of a dimension orthogonal to the m-dimension, and a lower right subregion that is adjacent to the lower left subregion in the direction of the m-dimension.

10. The information processing device according to claim 7, wherein the one or more processors are configured to, when the target data does not include partial data that is unassigned to a task, assign the first computing device the third task of processing data corresponding to a half of the third partial data to be processed with the task that is assigned to the second computing device.

11. The information processing device according to claim 1, wherein the one or more processors are is configured to instruct the first computing device to execute the second task of processing a first partial data of the one or more first partial data, the first partial data being not adjacent to a partial data that is processed with a task that is being executed by the second computing device.

12. An information processing method executed by an information processing device connected to a plurality of computing devices including a first computing device and a second computing device, the method comprising:
    assigning the first computing device one or more first tasks of processing respective one or more first partial data of a plurality of partial data included in n-dimensional target data, n being an integer greater than or equal to 2, the target data being processed using a neural network, the one or more first partial data including first data and second data that is adjacent to the first data in a direction of m-dimension, m being an integer satisfying $1 \leq m \leq n$; and
    instructing the first computing device to execute a second task included in the one or more first tasks, according to an execution status of second partial data of the partial data included in the target data, the second partial data being executed by the second computing device.

13. A computer program product comprising a non-transitory computer-readable medium including programmed instructions, the instructions causing a computer included in an information processing device connected to a plurality of computing devices including a first computing device and a second computing device, to perform:
    assigning the first computing device one or more first tasks of processing respective one or more first partial data of a plurality of partial data included in n-dimensional target data, n being an integer greater than or equal to 2, the target data being processed using a neural network, the one or more first partial data including first data and second data that is adjacent to the first data in a direction of m-dimension, m being an integer satisfying $1 \leq m \leq n$; and
    instructing the first computing device to execute a second task included in the one or more first tasks, according to an execution status of second partial data of the partial data included in the target data, the second partial data being executed by the second computing device.

* * * * *